(12) United States Patent
Wheat et al.

(10) Patent No.: US 7,028,700 B2
(45) Date of Patent: Apr. 18, 2006

(54) METHOD AND APPARATUS FOR LEVEL CONTROL IN A WATER TANK OF A FUEL REFORMER

(75) Inventors: W. Spencer Wheat, Missouri City, TX (US); Vesna R. Mirkovic, Pearland, TX (US); David H. Melton, Sealy, TX (US); David W. Harrison, Houston, TX (US)

(73) Assignee: Texaco, Inc., San Ramon, CA (US)

( * ) Notice: Subject to any disclaimer, the term of this patent is extended or adjusted under 35 U.S.C. 154(b) by 470 days.

(21) Appl. No.: 10/408,006

(22) Filed: Apr. 4, 2003

(65) Prior Publication Data

US 2006/0014062 A1 Jan. 19, 2006

(51) Int. Cl.
*G05D 9/12* (2006.01)

(52) U.S. Cl. ............................ 137/2; 137/391; 137/393; 73/290 V

(58) Field of Classification Search ................ 137/391, 137/392, 393, 1, 2, 11; 73/290 V
See application file for complete search history.

(56) References Cited

U.S. PATENT DOCUMENTS 3,809,116 A * 5/1974 Sanner ..................... 137/391
6,938,635 B1 * 9/2005 Bolland ....................... 137/2

* cited by examiner

*Primary Examiner*—Kevin Lee
(74) *Attorney, Agent, or Firm*—Williams, Morgan & Amerson; Frank C. Turner

(57) ABSTRACT

The present invention provides a method and apparatus for controlling a level in a receptacle capable of storing a fluid. The apparatus includes a first valve governing ingress of the fluid to the receptacle, a second valve governing egress of fluid from the receptacle, wherein the second valve is positioned below the first valve. The apparatus also includes a first switch deployed between the first valve and the second valve, wherein the first switch is capable of providing a first signal indicative of fluid at the first switch and a second switch deployed between the first switch and the second valve, wherein the second switch is capable of providing a second signal indicative of an absence of fluid at the second switch. The apparatus also includes a controller capable of controlling a fluid level in the receptacle by opening and closing the first and second valves responsive to the first and second signals.

31 Claims, 4 Drawing Sheets

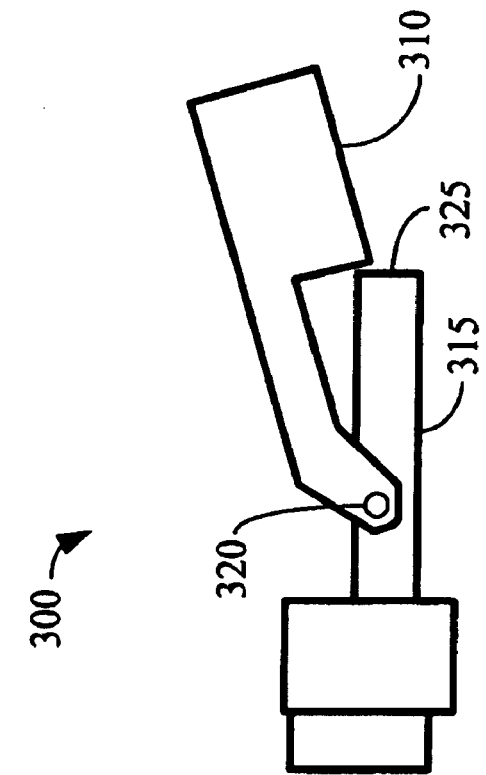
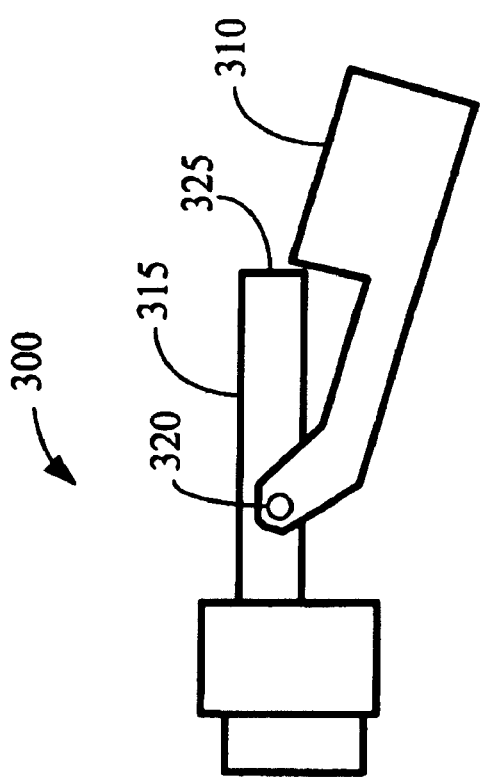

METHOD AND APPARATUS FOR LEVEL CONTROL IN A WATER TANK OF A FUEL REFORMER

BACKGROUND OF THE INVENTION

1. Field of the Invention

This invention relates generally to fuel reformers, and, more particularly, to level control in a water tank of a fuel reformer.

2. Description of the Related Art

Fuel cells are beginning to replace conventional sources of power in a variety of contexts, including cars, buses, houses, commercial buildings, and the like. The three main arguments in favor of fuel cells are abundance, efficiency, and cleanliness. First, the primary fuel for fuel cells is hydrogen, which is the most abundant element in the universe. Second, the efficiency of a fuel cell may exceed the Carnot Cycle limit while operating at a relatively low temperature. For example, a fuel cell operating at 80° C. is typically two to three times as efficient as an internal combustion engine, which may also require substantially higher operating temperatures. Third, the by-products of fuel cell operation are typically benign. For example, de-ionized water and fluorine are the only by-products of a fuel cell powered entirely by hydrogen.

One type of fuel cell is a polymer electrolyte membrane (PEM) fuel cell. This type of fuel cell may also be referred to as a proton exchange membrane fuel cell, a solid polymer electrolyte (SPE) fuel cell, or a polymer electrolyte fuel cell. In operation, hydrogen and oxygen are introduced into an anode and a cathode, respectively, of the PEM fuel cell. The hydrogen dissociates into electrons and protons, and the protons diffuse through an electrolyte membrane, such as the Nafion™ membrane produced by DuPont, that separates the anode from the cathode. When the protons reach the cathode, they react with the oxygen to form water and heat. The electrons are collected on the anode side of a bipolar collector plate and an opposite charge is collected on the cathode side of the bipolar plate. The charge difference results in an electric potential, which generates a voltage difference of approximately 0.7 volts between the anode and the cathode.

There are, however, a number of drawbacks to using pure hydrogen as the primary fuel for a fuel cell. Hydrogen gas has a relatively low energy density and there is as yet no infrastructure for hydrogen gas distribution. Although the energy density may be increased by liquefying the hydrogen, liquefying adds to the overall cost of the hydrogen and increases the energy required to use the hydrogen gas as a fuel. Furthermore, liquid hydrogen must be maintained at a low temperature and requires constant purging, and is therefore substantially more expensive to distribute than hydrogen gas. Thus, a number of primary fuels have been proposed, including natural gas, gasoline, propane, methanol, ethanol, naphtha, and the like. The proposed primary fuels either already have a distribution infrastructure in place or they are easier to handle and/or produce.

When using a primary fuel, a reformer, also referred to as a fuel processor, is used to produce hydrogen from the primary fuel. Three conventional reformer designs are steam reformers, partial oxidation reformers, and auto-thermal reformers. Steam reformers combine the primary fuel with steam and heat to produce a reformate containing a large percentage of hydrogen. The steam reforming reaction is endothermic and the heat required to operate the system is obtained by burning the primary fuel or excess reformate from an outlet of the fuel cell. Partial oxidation reformers combine the primary fuel with oxygen to produce a reformate containing a large percentage of hydrogen and carbon monoxide. The carbon monoxide then reacts with steam to increase the percentage of hydrogen in the reformate. Partial oxidation is an exothermic reaction that releases heat and, if integrated properly, the heat may be captured and used elsewhere in the system. Auto-thermal reformers combine the primary fuel with both steam and oxygen to achieve a heat balance wherein the exothermic partial oxidation reaction provides heat for the endothermic steam reforming reaction.

The water used to produce the steam in the reformer is typically drawn from a water tank. The water tank may have multiple input sources, such as condensate returned from the fuel cell, cooling loop return, fill lines from external utility connections, system surge caused by thermal expansion, and the like. Water ingress through the multiple input sources may raise the water level in the water tank in excess of a desirable level. Excess water in the water tank may cause the reformer and/or the fuel cell to operate in an undesirable manner or to fail altogether. For example, excess water may fill the reformer and/or the fuel cell or may disrupt the flow of gas through a section of the reactor.

The water tank typically also has multiple outputs, including the cooling loops, water provided to the fuel cell, water provided to the reformer, and the like. Egress through the multiple outputs may reduce the water to an undesirably low level, or remove the water entirely from the water tank. Low-water conditions in the water tank may cause the reformer and/or the fuel cell to operate in an undesirable manner or to fail altogether. For example, low water levels may reduce or stop the flow of process water to the reformer, which may reduce or stop the production of hydrogen fuel. For another example, low water levels may reduce or stop the flow of water to the fuel cell, which may reduce the water content of the electrolyte membrane and decrease the proton transfer in the PEM fuel cell.

SUMMARY OF THE INVENTION

In one aspect of the instant invention, an apparatus is provided for controlling a level in a receptacle capable of storing a fluid. The apparatus includes a first valve governing ingress of the fluid to the receptacle, a second valve governing egress of fluid from the receptacle, wherein the second valve is positioned below the first valve. The apparatus also includes a first switch deployed between the first valve and the second valve, wherein the first switch is capable of providing a first signal indicative of fluid at the first switch and a second switch deployed between the first switch and the second valve, wherein the second switch is capable of providing a second signal indicative of an absence of fluid at the second switch. The apparatus also includes a controller capable of controlling a fluid level in the receptacle by opening and closing the first and second valves responsive to the first and second signals.

In one aspect of the present invention, a method is provided for controlling a level in a receptacle capable of storing a fluid. The method includes determining whether a fluid is present at a first switch in a receptacle and determining whether the fluid is present at a second switch in a receptacle, wherein the second switch is below the first switch. The method also includes providing fluid to the receptacle in response to determining that the fluid is not present at the second switch and removing a portion of the fluid from the receptacle in response to determining that the fluid is present at the first switch.

BRIEF DESCRIPTION OF THE DRAWINGS

The invention may be understood by reference to the following description taken in conjunction with the accompanying drawings, in which like reference numerals identify like elements, and in which:

FIGS. 3A and 3B show two orientations of a switch that may be used in the exemplary system shown in FIG. 1.

Figure 1:
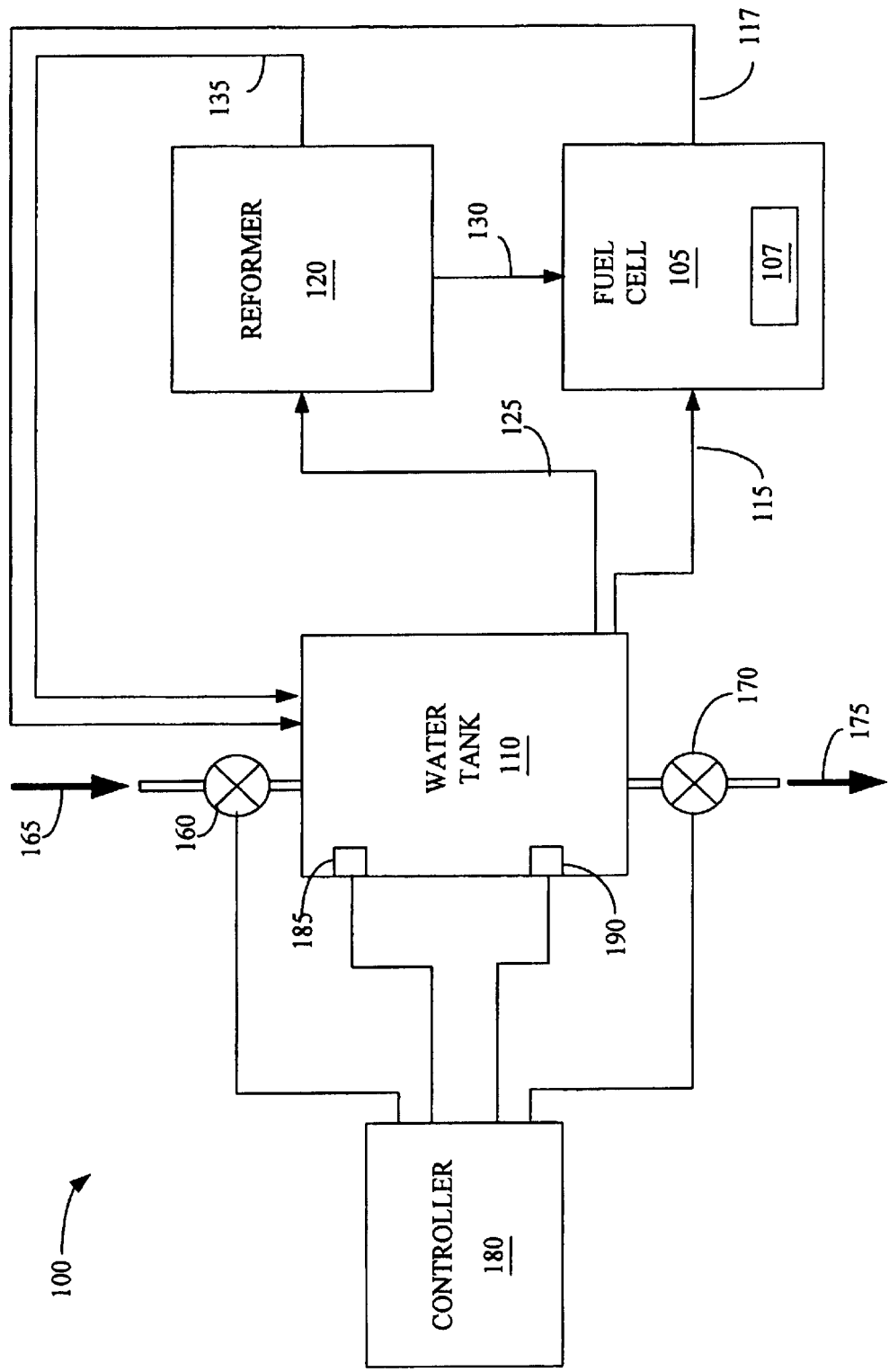
FIG. 1 conceptually illustrates an exemplary system for controlling water flow to a fuel reformer and a fuel cell.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

FIG. 1 conceptually illustrates a power plant 100 for controlling water flow to a fuel cell 105. Water stored in a water tank 110 is provided to the various components of the power plant 100 in a variety of ways, some of which are described in detail below. However, persons of ordinary skill in the art having the benefit of the present disclosure will appreciate that the present invention is not limited to applications including a water tank 110. In alternative embodiments, the present invention may be used to control fluid levels in any desirable receptacle capable of storing any desirable fluid. For example, the present invention may be used to control liquid fuel levels.

In the illustrated embodiment, the power plant 100 includes a reformer 120 that forms a reformate containing a high percentage of hydrogen from a primary fuel, such as natural gas, gasoline, propane, methanol, ethanol, naphtha, and the like. A water tank 110 is coupled to the reformer 120 via a line 125, which is capable of conveying water from the water tank 110 to the reformer 120. For example, the reformer 120 may be an auto-thermal reformer that heats water from the water tank 110 to form steam and then forms a reformate containing a high percentage of hydrogen by combining the steam with oxygen and the primary fuel. The reformate is then provided to the fuel cell 105 via line 130.

However, persons of ordinary skill in the art having benefit of the present disclosure will appreciate that other types of reformers 120, and other reforming processes, may be used without departing from the scope of the present invention. The water may also be used to regulate the temperature of the reformer 120. At least a portion of the water is then conveyed from the reformer 120 to the water tank 110 via the line 135.

In the illustrated embodiment, the water tank 110 is coupled to the fuel cell 105 via the line 115. Water is conveyed to the fuel cell 105, which may use the water for a variety of purposes. In one embodiment, the water is used to humidify elements in the fuel cell 105. The water may also be used to regulate temperatures in the fuel cell 105. For example, the fuel cell 105 may include a cooling element 107 and the water conveyed from the water tank 110 to the cooling element 107 may be used to cool the fuel cell 105. For a specific example, the cooling element 107 may use the water to cool the fuel cell 105 to a desired operating temperature of approximately 80° C. However, persons of ordinary skill in the art will appreciate that the cooling element 107 is not necessary for the practice of the present invention and, in alternative embodiments, may be omitted. At least a portion of the water is then conveyed from the fuel cell 105 to the water tank 110 via the line 117.

Water, indicated by the arrow 165, may be provided to the water tank 110 via an input valve 160. In various alternative embodiments, the water 165 may be provided from a variety of sources well known to those of ordinary skill in the art, including filtered de-ionized tap water. Water may also be drained from the water tank 110 via an output valve 170, as indicated by the arrow 175. In one embodiment, the input valve 160 and the output valve 170 are solenoids. However, in alternative embodiments, the input valve 160 and the output valve 170 may be mechanical floats (not shown).

The water level in the water tank 110 may increase, perhaps in excess of the desirable water level, as water is added to the water tank 110 via the input valve 160, the lines 117, 135, and/or any additional input sources not shown in FIG. 1. Conversely, the water level may be reduced to an undesirable level, or removed altogether, as water drains from the water tank 110 via the output valve 170, the lines 115, 125, and/or any additional outputs not shown in FIG. 1. Thus, as described in detail below, a controller 180 is coupled to the input valve 160, the output valve 170, and switches 185, 190. The switches 185, 190 provide signals to the controller 180 that may be used to reduce or avoid low water levels and/or excess water levels in the water tank 110.

Figure 2:
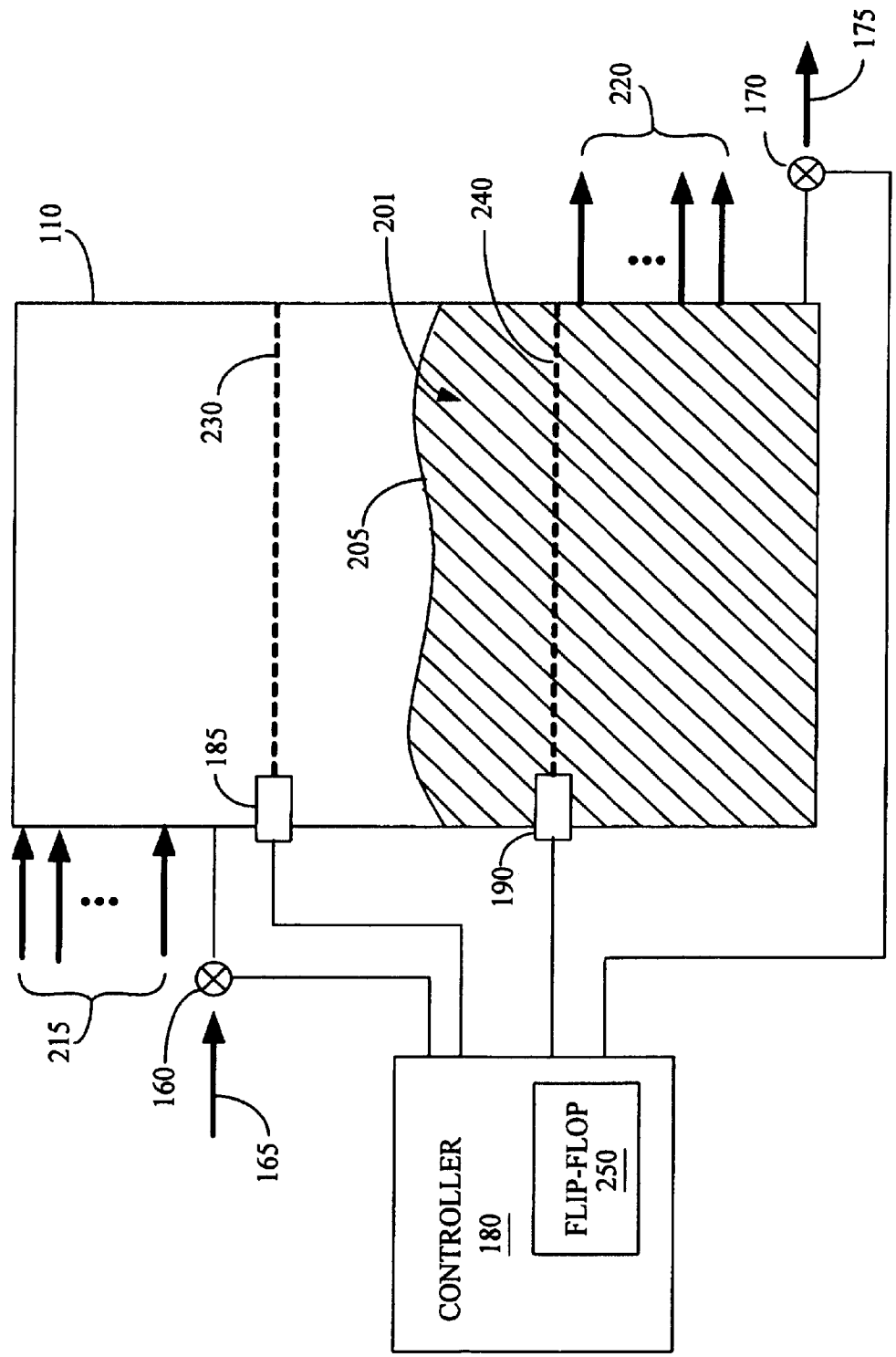
FIG. 2 conceptually illustrates a side view of a water tank that may be used in the exemplary system shown in FIG. 1.

FIG. 2 conceptually illustrates a side view of the water tank 110. In the illustrated embodiment, water 201 fills the water tank 110 to a water level 205. Although the water level 205 may be uniform across the water tank 110, those of ordinary skill in the art having benefit of the present disclosure will appreciate that the water level 205 will typically vary across the water tank 110. For example, motion and/or vibration of the water tank 110 may create disturbances in the water 201 that may cause the water level 205 to fluctuate. For another example, ingress to, and egress from, the water tank 110 may create disturbances in the water 201 that may cause the water level 205 to fluctuate. Thus, the water level 205 will be understood hereinafter to include these possible variations.

In addition to the valve 160, the water tank 110 may include a plurality of input sources 215 that allow ingress of water into the water tank 110. For example, the input sources 215 may include the lines 117, 135 shown in FIG. 1. However, in alternative embodiments, the present invention may include any desirable number of input sources 215. The water tank 110 may also include a plurality of outputs 220 that allow egress of water from the water tank 110, in addition to the previously described valve 170. For example, the outputs 220 may include the lines 115, 125 shown in FIG. 1. However, in alternative embodiments, the present invention may include any desirable number of outputs 220.

The switch 185 is deployed beneath the valve 160 and the input sources 215, relative to the vertical perspective, in the illustrated embodiment. However, in alternative embodiments, the switch 185 may be placed above the valve 160 and/or one or more of the input sources 215. If the water level 205 rises above a first level 230 that corresponds to the switch 185, the switch 185 may detect the presence of the water 201 at or above the first level 230 and provide a signal to the controller 180 indicating an excess water condition. For example, the switch 185 may provide a 12 Vdc "bit-high" signal in response to detecting the presence of the water 201 at or above the first level 230. However, as discussed above, the water level 205 may vary throughout the water tank 110 and thus the switch 185 may detect the presence of the water 201 at or above the first level 230 even though the water level 205 may not be above the first level 230 throughout the water tank 110. Conversely, the switch 185 may not detect the presence of the water 201 in all circumstances where the water level 205 reaches the first level 230. For example, if the water tank 110 is tilted, the water level 205 may exceed the first level 230 at a side of the water tank 100 opposite the switch 185, while falling below the first level 230 at a side of the water tank adjacent the switch 185.

The switch 190 is deployed beneath the switch 185 and above the valve 170 and the outputs 220. If the water level 205 falls below a second level 240 that corresponds to the switch 190, the switch 190 may not detect the presence of the water 201 and may provide a signal to the controller 180 indicating a low water condition. For example, the switch 190 may provide a 12 Vdc "bit-high" signal in response to detecting the absence of the water 201 at the second level 240. However, as discussed above, variations in the water level 205 may result in the switch 190 detecting the absence of the water 201 at the second level 240 even though the water level 205 may not be below the second level 240 throughout the water tank 110. Conversely, the switch 190 may not detect the absence of the water 201 in all circumstances where the water level 205 falls below the second level 240.

FIGS. 3A and 3B show a switch 300 in two different orientations. The switch 300 includes a buoyant element 310 and a magnetic switch device 315. The buoyant element 310 is pivotally coupled to the magnetic switch device 315 at a hinge 320. When the switch 300 is oriented in the manner shown in FIG. 3A, it is referred to as being in a "normally-open" orientation. In the normally-open orientation, the buoyant element 310 will not be adjacent to an end 325 of the magnetic switching device 315 when no water is present at the switch 300. When water is present at the switch 300, the buoyant element 310 will rise up adjacent to the end 325 of the magnetic switching device 315. In response to the buoyant element 310 being adjacent to the end 325, the magnetic switching device 315 will form a contact that produces a signal, which may be provided to the controller 180. In one embodiment, the switch 185 may be formed using the switch 300 in the normally-open orientation.

When the switch 300 is oriented in the manner shown in FIG. 3B, it is referred to as being in a "normally-closed" orientation. In the normally-closed orientation, the buoyant element 310 will be adjacent to an end 325 of the magnetic switching device 315 when no water is present at the switch 300. When water is not present at the switch 300, the buoyant element 310 will drop down adjacent to the end 325 of the magnetic switching device 315. In response to the buoyant element 310 being adjacent to the end 325, i.e. when the switch 300 is closed, the magnetic switching device 315 will form a contact that produces a signal, which may be provided to the controller 180. In one embodiment, the switch 190 may be formed using the switch 300 in the normally-closed orientation.

Referring back to FIG. 2, the controller 180 uses the signals provided by the switches 185, 190 to control the water level in the water tank 110. Although not necessary for the practice of the present invention, in the illustrated embodiment, the controller 180 includes a flip-flop 250. As discussed above, when the water level 205 falls below the second level 240, the switch 190 provides a signal indicative of the low-water condition to the controller 180. For example, when the switch 190 is embodied in the switch 300 deployed in the normally-closed orientation, the switch 190 closes when the water level 205 falls below the second level 240 and completes a circuit (not shown) from a ground potential to positive potential control signal, which is provided to the controller 180 as a bit-high signal.

In response to the signal, the controller 180 sets the flip-flop 250. For example, the controller 180 may set an output of the flip-flop 250 to logic-high. The valve 160 opens in response to setting the flip-flop 250 and water may then flow through the valve 160 along the direction indicated by the arrow 165. Ingress of the water may then fill the water tank 110, raising the water level 205. The valve 160 remains open until the controller 180 detects the aforementioned signal indicating an excess water condition, which is provided when the switch 185 detects the presence of the water 201 at or above the first level 230. For example, when the switch 185 is embodied in the switch 300 deployed in the normally-open orientation, the switch 185 closes when the water level 205 rises above the first level 230 and completes a circuit (not shown) from a ground potential to a positive potential control signal, which is provided to the controller 180 as a bit-high signal.

In response to the excess water condition signal, the controller 180 re-sets the flip-flop 250. For example, the controller 180 may reset the output of the flip-flop 250 to logic-low. The valve 160 closes in response to re-setting the flip-flop 250 and water stops flowing into the water tank 110. The valve 170 opens in response to re-setting the flip-flop 250 and water flows out of the water tank 110 along the direction indicated by the arrow 175, lowering the water level 205. When the water level 205 drops below the first level 230, the switch 185 stops providing the excess water condition signal to the controller 180. For example, the switch 185 may provide a logic-low signal to the controller 180. The valve 170 closes when the switch 185 stops providing the excess water condition signal to the controller 180.

As discussed above, water may also be provided to the water tank 110 by the various input sources 215. Consequently, the water level 205 may rise above the first level 230. The switch 185 then provides the excess water condition signal to the controller 180, which may act to reduce the water level 205 in the manner described above. For example, the excess water condition signal may be an analog throughput. Alternatively, water may be removed from the water tank 110 by the various outputs 220 and the water level may fall below the second level 240. The switch 190 may then provide the low water signal to the controller 180, which may act to increase the water level 205 in the manner described above.

Figure 4:
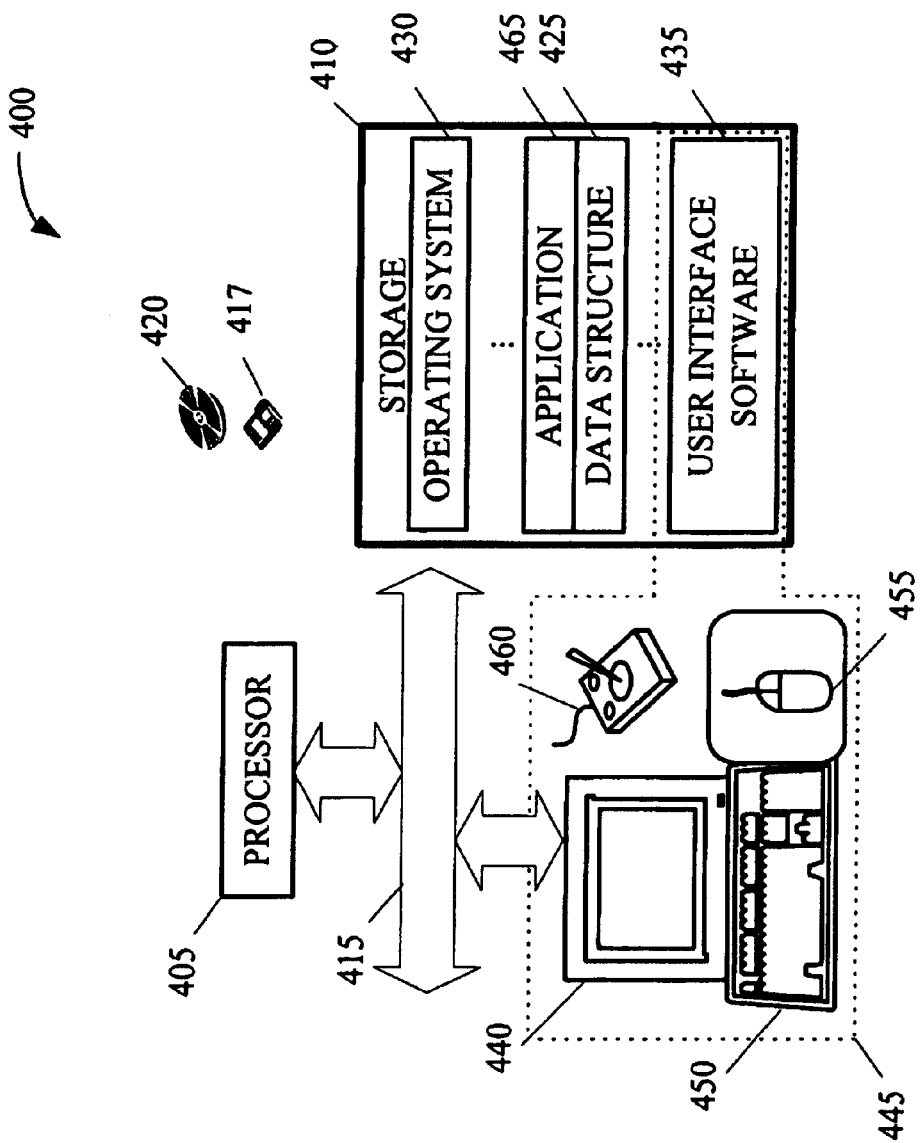
FIG. 4 shows a computer apparatus that may be used as a controller in the exemplary system shown in FIG. 1.

In one embodiment, the controller 180 is embodied in a computing apparatus 400 that may be used to perform the aforementioned operations, such as the computing apparatus 400 shown in FIG. 4. The computing apparatus 400 includes a processor 405 communicating with some storage 410 over a bus system 415. The storage 410 may include a hard disk and/or random access memory ("RAM") and/or removable storage such as a floppy magnetic disk 417 and an optical disk 420. The storage 410 is encoded with a data structure 425 storing the signals collected as discussed above, an operating system 430, user interface software 435, and an application 465. The user interface software 435, in conjunction with a display 440, implements a user interface 445. The user interface 445 may include peripheral I/O devices such as a key pad or keyboard 450, a mouse 455, or a joystick 460. The processor 405 runs under the control of the operating system 430, which may be practically any operating system known to the art. The application 465 is invoked by the operating system 430 upon power up, reset, or both, depending on the implementation of the operating system 430.

Data may be communicated directly to the computing apparatus 400 via wires, wireless links, and the like, or data may be communicated to the computing apparatus 400 via a storage medium, including, but not limited to, recording tape, magnetic disks, compact disks, and DVDs. Some portions of the detailed descriptions herein are consequently presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantifies. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. An apparatus, comprising:
   a receptacle capable of storing a fluid;
   a first valve governing ingress of the fluid to the receptacle;
   a second valve governing egress of fluid from the receptacle, wherein the second valve is positioned below the first valve;
   a first switch deployed between the first valve and the second valve, wherein the first switch is capable of providing a first signal indicative of fluid at the first switch;
   a second switch deployed between the first switch and the second valve, wherein the second switch is capable of providing a second signal indicative of an absence of fluid at the second switch; and
   a controller capable of controlling a fluid level in the receptacle by opening and closing the first and second valves responsive to the first and second signals.

2. The apparatus of claim 1, further comprising at least one input source capable of providing the fluid to the receptacle.

3. The apparatus of claim 2, wherein the at least one input source is deployed above the first switch.

4. The apparatus of claim 1, further comprising at least one output through which the fluid may drain from the receptacle.

5. The apparatus of claim 4, wherein the at least one output is capable of providing the fluid to a fuel cell.

6. The apparatus of claim 4, wherein the at least one output is capable of providing the fluid to a fuel reformer.

7. The apparatus of claim 4, wherein the at least one output is capable of providing the fluid to a fuel cell and a fuel reformer.

8. The apparatus of claim 1, wherein the first switch is closed when the fluid is present at the first switch.

9. The apparatus of claim 1, wherein the first switch comprises a buoyant element oriented such that the first switch is closed when the fluid is present at the first switch.

10. The apparatus of claim 1, wherein the second switch is open when the fluid is present at the first switch.

11. The apparatus of claim 10, wherein the second switch comprises a buoyant element oriented such that the second switch is open when the fluid is present at the second switch.

12. The apparatus of claim 1, wherein the fluid is water and the receptacle is a water tank.

13. The apparatus of claim 1, wherein the controller comprises a flip-flop.

14. A method, comprising:
 determining whether a fluid is present at a first switch in a receptacle;
 determining whether the fluid is present at a second switch in a receptacle, wherein the second switch is below the first switch;
 providing fluid to the receptacle in response to determining that the fluid is not present at the second switch; and
 removing a portion of the fluid from the receptacle in response to determining that the fluid is present at the first switch.

15. The method of claim 14, wherein removing the portion of the fluid comprises draining the fluid from the receptacle until it is determined that the fluid is not present at the first switch.

16. The method of claim 14, wherein providing fluid to the receptacle in response to determining that the fluid is not present at the second switch comprises providing fluid to the receptacle until it is determined that the fluid is present at the first switch.

17. The method of claim 14, wherein determining whether the fluid is present at the first switch comprises determining whether the first switch is closed.

18. The method of claim 17, wherein determining whether the fluid is present at the first switch comprises providing a first signal in response to determining that the first switch is closed.

19. The method of claim 14, wherein determining whether the fluid is not present at the second switch comprises determining whether the second switch is closed.

20. The method of claim 19, wherein determining whether the fluid is present at the second switch comprises providing a second signal in response to determining that the second switch is open.

21. The method of claim 14, wherein providing fluid to the receptacle comprises opening a first valve deployed above the first switch.

22. The method of claim 14, wherein removing the portion of the fluid from the receptacle comprises opening a second valve deployed below the second switch.

23. An apparatus, comprising:
 means for determining whether a fluid is present at a first switch in a receptacle;
 means for determining whether the fluid is present at a second switch in a receptacle, wherein the second switch is below the first switch;
 means for providing fluid to the receptacle in response to determining that the fluid is not present at the second switch; and
 means for removing a portion of the fluid from the receptacle in response to determining that the fluid is present at the first switch.

24. The apparatus of claim 23, wherein the means for determining whether the fluid is present at the first switch comprises means for determining whether the first switch is closed.

25. The apparatus of claim 23, wherein the means for determining whether the fluid is not present at the second switch comprises means for determining whether the second switch is closed.

26. The apparatus of claim 23, wherein the means for providing fluid to the receptacle in response to determining that the fluid is not present at the second switch comprises means for providing fluid to the receptacle until it is determined that the fluid is present at the first switch.

27. The apparatus of claim 23, wherein the means for removing the portion of the fluid comprises means for draining the fluid from the receptacle until it is determined that the fluid is not present at the first switch.

28. A method of controlling a water level in a water tank that is capable of providing water to a fuel reformer, wherein the water tank has a plurality of sources of water ingress and a plurality of outputs for water egress, comprising:
 determining whether water is present at a first switch in the water tank;
 determining whether water is present at a second switch in the water tank, wherein the second switch is deployed below the first switch;
 providing water to the water tank via one of the plurality of input sources in response to determining that water is not present at the second switch; and
 allowing water egress from the water tank via one of the plurality of outputs in response to determining that water is present at the first switch.

29. The method of claim 28, wherein determining whether water is present at the first switch comprises determining whether the first switch is closed, and wherein the first switch is normally open.

30. The method of claim 29, wherein allowing egress of water from the water tank in response to determining that water is present at the first switch further comprises:
 detecting the first switch opening; and
 stopping egress of water from the tank in response to detecting the first switch opening.

31. The method of claim 28, wherein determining whether water is present at the second switch comprises determining whether the second switch is open, and wherein the second switch is normally closed.

* * * * *